Feb. 7, 1933.  S. M. CHASE  1,896,698
CASTER
Filed March 21, 1931  2 Sheets-Sheet 1
FIG. 1
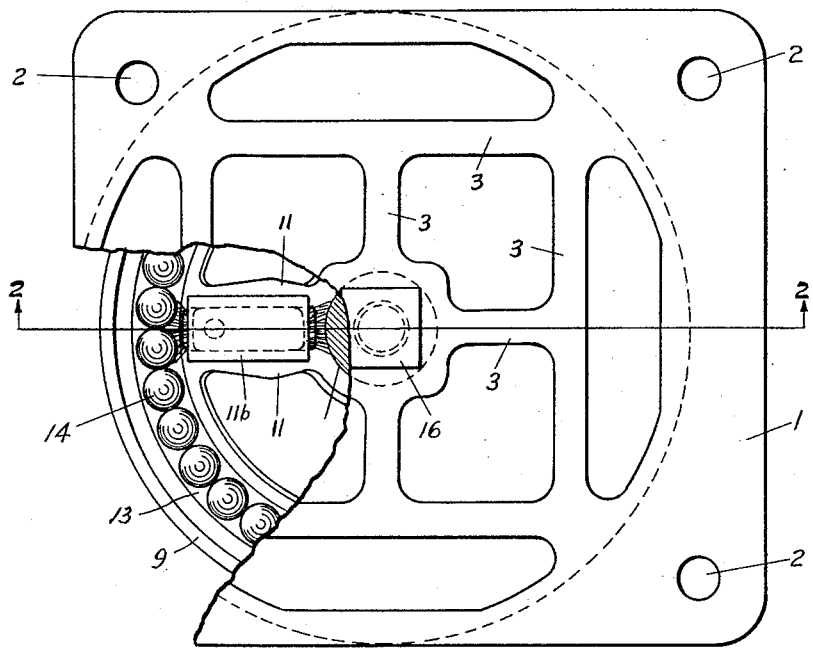
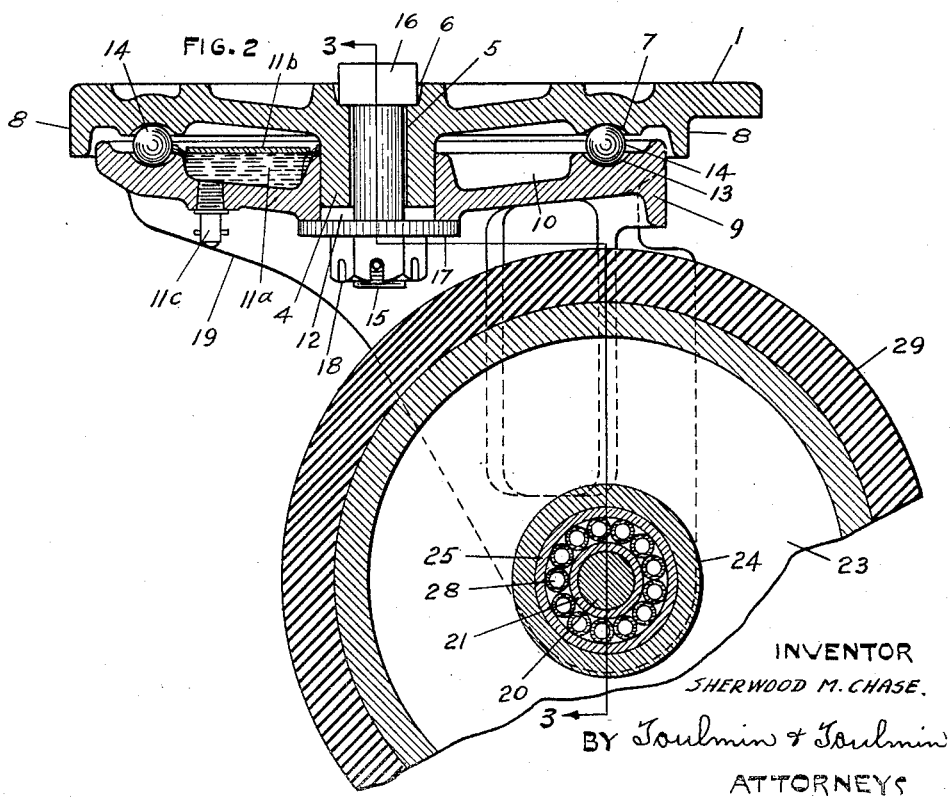
INVENTOR
SHERWOOD M. CHASE.
BY Toulmin & Toulmin
ATTORNEYS Feb. 7, 1933.   S. M. CHASE   1,896,698
CASTER
Filed March 21, 1931   2 Sheets-Sheet 2

INVENTOR
SHERWOOD M. CHASE.
BY Toulmin + Toulmin
ATTORNEYS

Patented Feb. 7, 1933

1,896,698

UNITED STATES PATENT OFFICE

SHERWOOD M. CHASE, OF COLUMBUS, OHIO, ASSIGNOR TO THE CHASE FOUNDRY & MFG. CO., OF COLUMBUS, OHIO, A CORPORATION OF OHIO

CASTER

Application filed March 21, 1931. Serial No. 524,294.

This invention relates to improvements in casters and caster plates for use on trailer trucks and similar equipments, and has for its object to provide in a caster plate means for confining the lubricant, which is of the consistency of cup grease, to a chamber which distributes the lubricant to the center bearing of the plate and the ball race therein.

It is particularly the object of this invention to provide in a caster plate a lubricant chamber disposed radially of the plate, and provide in connection with this chamber means for delivering the grease to the chamber, this means consisting of a connection placed under the plate and communicating with the chamber so that grease may be forced into the chamber and to the bearings.

These and other advantages will appear from the following description taken in connection with the drawings, in which there is shown a preferred embodiment of this invention.

Figure 1 is a top-plan view showing the upper plate partly broken away to disclose the lubricant chamber and its connections with the bearings.

Figure 2 is a vertical section on the line 2—2 of Figure 1.

Figure 3:
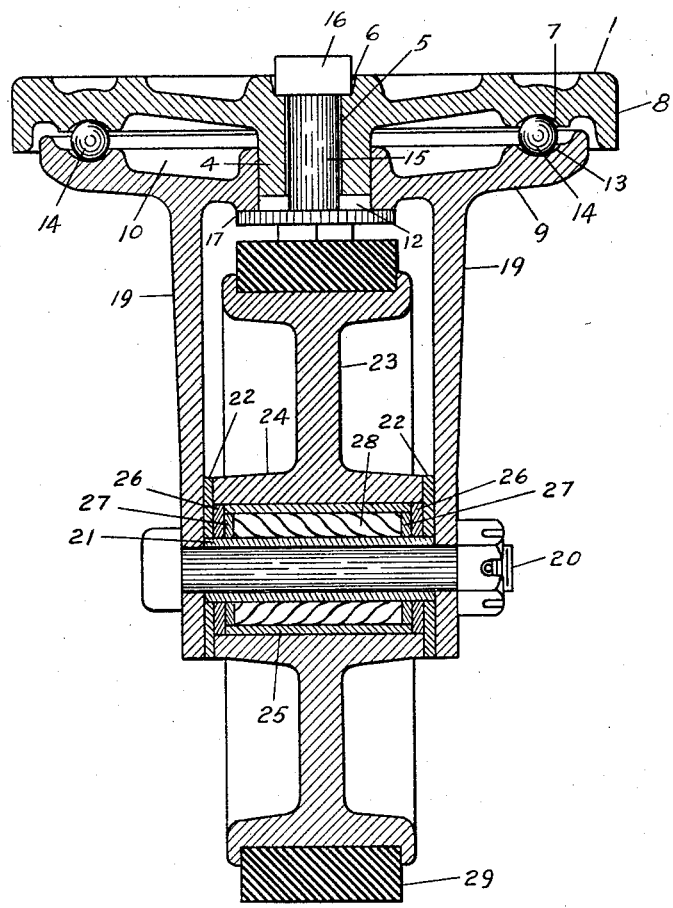
Figure 3 is a section on line 3—3 of Figure 2.

The reference numeral 1 is used to designate an upper plate, which is adapted to be attached to trailer trucks and similar equipments. For this purpose, there is provided in each corner of the plate a hole 2, through which bolts pass for attaching the plate to the truck. In the present instance, this plate is shown to be substantially square, but it may be of any suitable or convenient form or shape. On the upper surface of this upper plate, there is a plurality of ribs 3 which add strength to the plate and reduce the amount of material for the same strength.

In the center of the upper plate is a downwardly-extending hub member 4 which has a hole 5 therein. In the center of the plate above the hub is a depression 6, the purpose of which will be later described. Extending around the underface of the plate is a circular groove 7, around which there is a flange 8.

The lower caster plate is indicated by the numeral 9 and has in its upperface an annular cavity 10. Across this cavity are two radially-disposed walls 11, which form a grease cup or chamber 11a. Over this chamber is a plate 11b, which leaves each end of the chamber exposed so that the grease in the chamber may pass to the bearings at the ends of the chamber.

Extending into the chamber from and through the plate is a fitting or connection 11c, through which the grease is forced into the chamber and from the chamber to the bearings at the ends thereof. In the center of the lower caster plate is a hole 12 to receive the hub member 4. This plate is circular in shape and has adjacent its periphery a groove 13 cooperating with groove 7 to form a ball race in which there are balls 14.

For the purpose of holding the two plates together, a bolt 15 extends through the hole 5 in the upper plate. On one end of this bolt is a head 16 which rests in the depression 6 of the upper plate. On the other end of the bolt is a washer 17 which engages the lower surface of the lower caster plate. This washer is held in place by means of a nut 18 on the bolt 15. By means of this bolt the two plates may be attached to each other so that the parts are held in proper adjusting relation to each other.

Extending downwardly from the lower caster plate 9 is a pair of arms 19. Each arm has in its lower end, a hole through which a bolt 20 extends. Around this bolt and between the arms 19 is a hard steel sleeve 21. This sleeve serves to space the arms 19 apart and hold them in fixed position when the nut on the end of the bolt is adjusted.

Adjacent the innerface of each arm and around the bolt 20 is a steel washer 22. The bolt 20 carries on it a wheel 23 having a hub 24 with the usual hole therein. In this hub is a sleeve 25 slightly shorter than the hub so that at each end of the sleeve is a space, in which there is an annular washer 26. Fitting within the sleeve 25 and at each end thereof is a washer 27. The washers 27 are adjacent the washers 26 and provide with the two sleeves an annular space in which there are rollers 28. These are anti-friction rollers and serve to provide anti-friction means by which the wheel may easily rotate about the bolt 20.

On the outer periphery of the wheel is a rubber tire 29. By means of applicant's improved lubricant container or chamber, the amount of lubricant used is limited so that there is no waste of lubricant. When the lubricant is placed in the chamber through the fitting or connection, it is forced out at the ends of the chamber into the bearings, between the hub 4 and the lower caster plate and into the ball race, in which the anti-friction balls are located.

When the whole annular cavity was used as a lubricant chamber, a great deal of the lubricant was wasted and lost, but by the present improved lubricant containing chamber only the amout of lubricant necessary to properly lubricate the parts is used.

I desire to comprehend within my invention such modifications as may be clearly embraced within my claims and the scope of my invention.

Having thus fully described my invention, what I claim as new and desire to secure by Letters Patent, is:

1. In a caster, a lower plate having a central hole therein, and a peripheral groove, a lubricant chamber having substantially parallel lateral walls between the hole and the groove, an upper plate having a central hub fitting in said hole, and a peripheral groove cooperating with the first groove to form a ball race, balls in said race, and a cover for the chamber forming with the chamber a lubricant passageway to the central hole and to the ball race.

2. In a caster, a plate having a central hole, and a groove extending around the hole but spaced therefrom, a second plate having a hub fitting in said hole, and a groove cooperating with the first groove to form a ball race, balls in said race, and a lubricant chamber between said plates for providing lubricant to the race and the hole, said chamber having substantially radially extending parallel lateral walls.

In testimony whereof, I affix my signature.

SHERWOOD M. CHASE.